US012139955B2

(12) United States Patent
Pellegrini et al.

(10) Patent No.: US 12,139,955 B2
(45) Date of Patent: Nov. 12, 2024

(54) DOOR DRIVE FOR VEHICLE SLIDING DOOR SYSTEM

(71) Applicant: Bode-Die Tür GmbH, Kassel (DE)

(72) Inventors: Andreas Pellegrini, Edermünde (DE); Abbas Rasekhi Coochesfahani, Kassel (DE)

(73) Assignee: BODE-DIE TÜR GMBH, Kassel (DE)

( * ) Notice: Subject to any disclaimer, the term of this patent is extended or adjusted under 35 U.S.C. 154(b) by 0 days.

(21) Appl. No.: 18/250,052

(22) PCT Filed: Oct. 14, 2021

(86) PCT No.: PCT/EP2021/078466
§ 371 (c)(1),
(2) Date: Apr. 21, 2023

(87) PCT Pub. No.: WO2022/084146
PCT Pub. Date: Apr. 28, 2022

(65) Prior Publication Data

US 2023/0399886 A1 Dec. 14, 2023

(30) Foreign Application Priority Data

Oct. 23, 2020 (DE) ..................... 20 2020 106 072.4

(51) Int. Cl.
*E05F 15/643* (2015.01)
*E05F 15/662* (2015.01)

(52) U.S. Cl.
CPC .......... *E05F 15/643* (2015.01); *E05F 15/662* (2015.01); *E05Y 2201/654* (2013.01); *E05Y 2201/668* (2013.01); *E05Y 2900/531* (2013.01)

(58) Field of Classification Search
CPC ..... E05F 15/643; E05F 15/662; E05F 15/652; E05F 15/655; E05Y 2900/531; E05Y 2600/45

(Continued)

(56) References Cited

U.S. PATENT DOCUMENTS 2,746,745 A * 5/1956 Damon ................. E05B 49/004
194/902
3,137,491 A * 6/1964 Coenen .................... B60J 7/057
49/281

(Continued)

FOREIGN PATENT DOCUMENTS

AT 414006 B * 5/2006 ............ E05F 15/652
DE 2916209 C2 * 6/1989

(Continued)

OTHER PUBLICATIONS

International Search Report for International Application No. PCT/EP2021/078466, dated Feb. 10, 2022, 2 pages.

*Primary Examiner* — Jerry E Redman
(74) *Attorney, Agent, or Firm* — CANTOR COLBURN LLP

(57) ABSTRACT

A vehicle sliding door system includes a door portal and a door opening, at least one sliding door with an, in the closing direction of the sliding door, vertical front lateral edge and an, in the closing direction of the sliding door, vertical rear lateral edge, and a door driving unit for displacing the sliding door. The door driving unit has a cable, which, with its first end, is attached to the sliding door in the region of the front vertical lateral edge, and with its second end in the region of the rear vertical lateral edge, a coupling member, connected to the cable and which is connected to a motor, which is attached on the door portal laterally next to the door portal and which drives the coupling member such that the cable is movable along its longitudinal extent in both directions of movement and displaces the sliding door.

8 Claims, 3 Drawing Sheets

(58) Field of Classification Search
USPC ............................................................ 49/360
See application file for complete search history.

(56) References Cited

U.S. PATENT DOCUMENTS

| | | | | | |
|---|---|---|---|---|---|
| 3,403,474 | A * | 10/1968 | Spasoff | E05F 15/643 | 74/89.22 |
| 3,913,267 | A * | 10/1975 | Knippel | E05D 15/1007 | 49/281 |
| 4,593,793 | A * | 6/1986 | Salmon | B66B 13/08 | 49/352 |
| 5,282,663 | A * | 2/1994 | Horton | B60J 5/065 | 160/150 |
| 5,377,448 | A * | 1/1995 | Boyd | E05F 1/025 | 49/362 |
| 5,775,029 | A * | 7/1998 | Buening | E05F 11/535 | 49/380 |
| 6,189,265 | B1 * | 2/2001 | Fink | E05F 15/652 | 49/118 |
| 6,918,210 | B1 * | 7/2005 | Smiley | E05F 15/643 | 49/347 |
| 7,337,581 | B2 * | 3/2008 | Kriese | E05D 15/1047 | 49/358 |
| 7,856,759 | B2 * | 12/2010 | Elliott | E05D 15/58 | 49/358 |
| 10,828,970 | B2 * | 11/2020 | Richards | E05F 15/646 | |
| 2005/0044794 | A1 * | 3/2005 | Kriese | B60J 5/06 | 49/360 |
| 2023/0399886 | A1 * | 12/2023 | Pellegrini | E05F 15/643 | |

FOREIGN PATENT DOCUMENTS

| | | | | |
|---|---|---|---|---|
| DE | 102014101036 | A1 | 7/2015 | |
| DE | 202014102405 | U1 | 8/2015 | |
| DE | 202021101854 | U1 * | 9/2022 | |
| JP | S57104781 | A | 6/1982 | |
| JP | 2005273142 | A | 10/2005 | |
| WO | WO-2018002158 | A1 * | 1/2018 | E05C 17/003 |

* cited by examiner

DOOR DRIVE FOR VEHICLE SLIDING DOOR SYSTEM

CROSS-REFERENCE TO RELATED APPLICATIONS

This application is a 35 U.S.C. § 371 National Stage patent application of PCT/EP2021/078466, filed on 14 Oct. 2021, which claims the benefit of German patent application 20 2020 106 072.4, filed on 23 Oct. 2020, the disclosures of which are incorporated herein by reference in their entirety.

TECHNICAL FIELD

The present disclosure relates to a vehicle sliding door system with a door portal and a door opening, at least one sliding door with an, in the closing direction of the sliding door, vertical front lateral edge and an, in the closing direction of the sliding door, vertical rear lateral edge, and a door driving unit for displacing the sliding door.

BACKGROUND

Door driving units for a motor vehicle or a rail-bound vehicle are generally known. By means of the known door driving units, a sliding door arranged in a rail-bound vehicle can preferably be automatically displaced between an opening position and a closing position, wherein a passage is open in the opening position and the passage is blocked in the closing position.

For example, an automatic sliding door with a driving unit and at least one displaceable door leaf is known from DE 10 2014 101 036 A1. The door leaf can be moved between an open and a closed position. The driving unit has at least one electric drive motor with a transmission and a continuous toothed belt to which the door portal is attached by means of lugs on a strand. The sliding door has a locking device with which the displaceable door leaf can be locked or unlocked, with the locking device acting on the motor shaft of the drive motor.

In most cases, the door driving units are placed in the upper region of the portal and most frequently consist of toothed belts or spindle drives. Thus, the usable space above the door openings is considerably reduced, which is disadvantageous. The combination of a locking device with door driving units arranged there is often also difficult and does not work reliably in the long run.

SUMMARY

The present disclosure provides a vehicle sliding door system which requires as little construction space as possible above or below the door portal. In this case, the vehicle sliding door system is supposed to have a structure that is as simple and rugged as possible, so that, in particular, the effort for maintenance and service is also minor. Finally, the vehicle sliding door system is supposed to be suitable for being combined with a rugged locking device that works reliably.

According to the disclosure, this advantage is achieved by providing a vehicle sliding door system having the features of the independent claims.

The disclosure is substantially based on the arrangement of the door driving unit laterally of, and not above or below, the door portal. The wording “laterally of the door portal”, which is used below and also in the patent claims thus merely relates to an arrangement in the horizontal direction laterally of the door portal, and not above or below it. Substantially, this is achieved by using a cable, which, with its first end is attached to the sliding door in the region of a, in the closing direction, front vertical lateral edge, and with its second end in the region of the, in the closing direction, rear vertical lateral edge. The cable can be moved by means of a door driving unit, which is connected via a coupling member to the cable, so that the sliding door moves in the opening or closing direction due to pulling forces applied, depending on the direction of movement of the coupling member. The coupling member is firmly connected to the cable and thus cannot be displaced relative to the cable, and always pulls it along when moving along a longitudinal direction of the cable. In turn, the coupling member can be moved by means of a motor, particularly an electric motor.

The movement of the coupling member acts on the sliding door in such a manner that the latter is moved out of or into the door opening along its displacement path, i.e. in the horizontal direction. For this purpose, in a first embodiment according to the disclosure, the cable extends in a first portion from the front vertical lateral edge in the horizontal direction to a first roller arranged on the door portal. In a second portion, the cable then extends in the vertical direction from the first roller to a second roller, which is also arranged on the portal and below the first roller, is redirected about the second roller, and then extends in a third portion in the vertical direction from the second roller back to a third roller. The third roller is located in the immediate vicinity of the first roller and is also rotatably mounted on the door portal. Starting from the third roller, the cable then again extends in a fourth portion in the horizontal direction, i.e. in the direction of the displacement path, to the rear vertical lateral edge of the sliding door. The rollers, the coupling member and the driving unit are not located above or below the door opening, but rather laterally thereof. Depending on the arrangement, only the first and third rollers may be arranged, with respect to the vertical direction, above or below the door opening, but nevertheless laterally thereof in the horizontal direction. Only the cable runs above or below the door opening, whereby construction space for other uses is obtained in these regions.

Advantageously, the coupling member is fixed to one of the two vertically extending cable portions, i.e. to the second portion or the third portion. If the coupling member firmly connected to the cable is now moved upwards or downwards in the vertical direction, the cable is moved along accordingly and, depending on the direction of movement of the coupling member, pulls on the sliding door either by means of the attaching means on the front vertical lateral edge or the attaching means on the rear vertical lateral edge. The sliding door can thus be opened and closed by means of the coupling member.

For example, the coupling member may be configured as a spindle nut, which can be displaced on a spindle extending parallel to the second and third portions of the cable. By means of the motor, the spindle is made to rotate and thus displaces the coupling member and the sliding door connected therewith by means of the cable.

It is also conceivable that the cable, in at least some portions, is configured like a kind of toothed belt driven by a driven pinion gear. For example, one or several of the above-described rollers may be configured as a driven pinion gear meshing with a toothed region of the cable. Accordingly, the cable is configured in a similar manner as a toothed belt across a longitudinal section of suitable length. In this case, the toothed belt portion may be formed from the cable itself, but may also be formed by an additional element connected to the cable. In principle, the entire cable may even be replaced with a toothed belt, which is moved via one or several rollers.

In another embodiment of the disclosure, it is also possible to configure the coupling member as a cable pulley with a corresponding cable strand. Depending on the direction of rotation, the cable can be spooled up or unspooled on the cable pulley in both directions. Thus, by rotating the cable pulley, the sliding door may be pulled either by means of the first attaching means on the front vertical lateral edge or second attaching means on the rear vertical lateral edge. The rotation of the cable pulley is in this case also caused by the motor. Preferably, the cable pulley is positioned such that a redirection of the cable by means of additional rollers can be dispensed with. For this purpose, the cable pulley is preferably located on the door portal laterally of the door opening, at the same height in the vertical direction as the two attachment points of the cable on the sliding door. The motor is arranged above or below that.

Advantageously, all of the components of the door driving unit, i.e. the motor, the coupling member, possibly the rollers and possibly the cable pulley, are thus fixed to the door portal; the connection with the sliding door is effected exclusively by means of the cable. However, it is also conceivable that individual components are attached to the sliding door itself.

The vehicle sliding door system is particularly suitable for use with an advantageous locking unit. For this purpose, the motor housing is rotatably mounted, relative to the motor itself, on the door portal. Thus, the rotation required for driving the cable pulley and the cable, and thus the drive torque of an output shaft of the motor, as well as the rotation of the motor housing may be used. In the event a spindle nut is used as a coupling member, for example, if the spindle nut has reached the end of the spindle and cannot be moved any further in the closed final position of the sliding door, the rotatably mounted motor housing rotates and acts on a locking lever. The locking lever moves into a recess or depression in the sliding door or abuts against a corresponding counter bearing and thus blocks the sliding door against being displaced in the opening direction.

In a particularly advantageous embodiment, another joint lever which, with one free end, is pivotably connected to the motor housing and, with its other end, is pivotably connected to the locking lever, is disposed between the locking lever and the motor housing. If the locking lever is located in the recess or on the counter bearing, the locking lever, the joint lever and the motor housing form an over-dead-center position blocking the sliding door against being displaced in the opening direction. In order to open the sliding door, the motor housing first has to be rotated in the opposite direction, and the over-dead-center position has to be passed.

The combination of the door driving unit according to the disclosure with the locking unit is particularly advantageous because the motor housing is arranged on the door portal laterally of the sliding door anyway. Thus it is possible, using only two levers, to securely lock the sliding door.

BRIEF DESCRIPTION OF THE DRAWINGS

The disclosure is explained further with reference to the following Figures. The depicted exemplary embodiments are not to be understood as limiting but rather as examples, and are supposed to enable the person skilled in the art to carry out the disclosure. The applicant reserves the right to make individual ones or several of the features disclosed in the exemplary embodiment the subject matter of claims, or to incorporate such features into existing claims. The Figures are to be understood merely as schematic illustrations; in particular, dimensions and shapes may vary.

In the Figures.

DETAILED DESCRIPTION OF THE DRAWINGS

Figure 1:
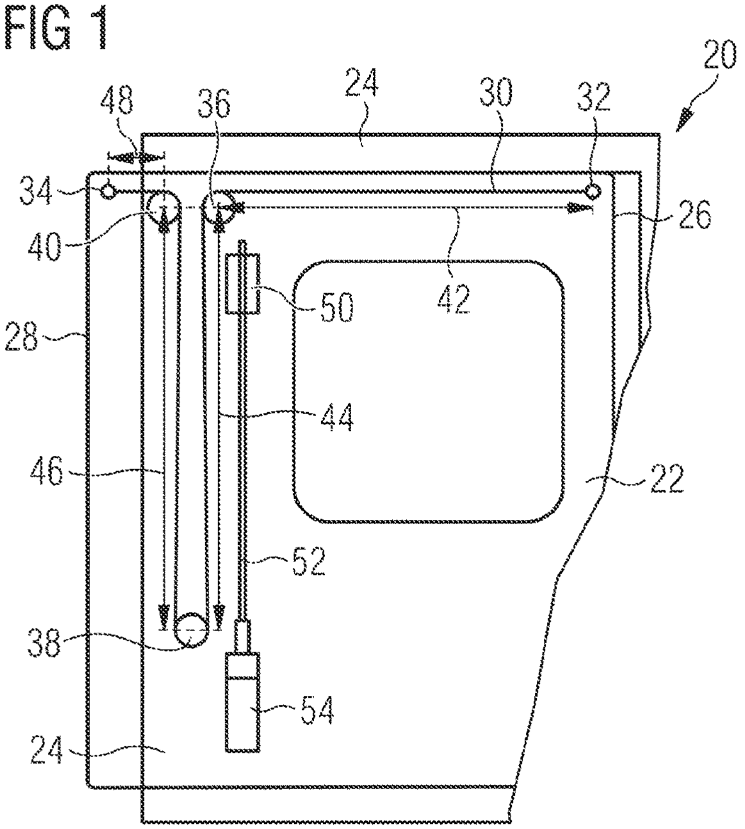
FIG. 1: shows a vehicle sliding door system according to the disclosure with a closed sliding door.
Figure 2:
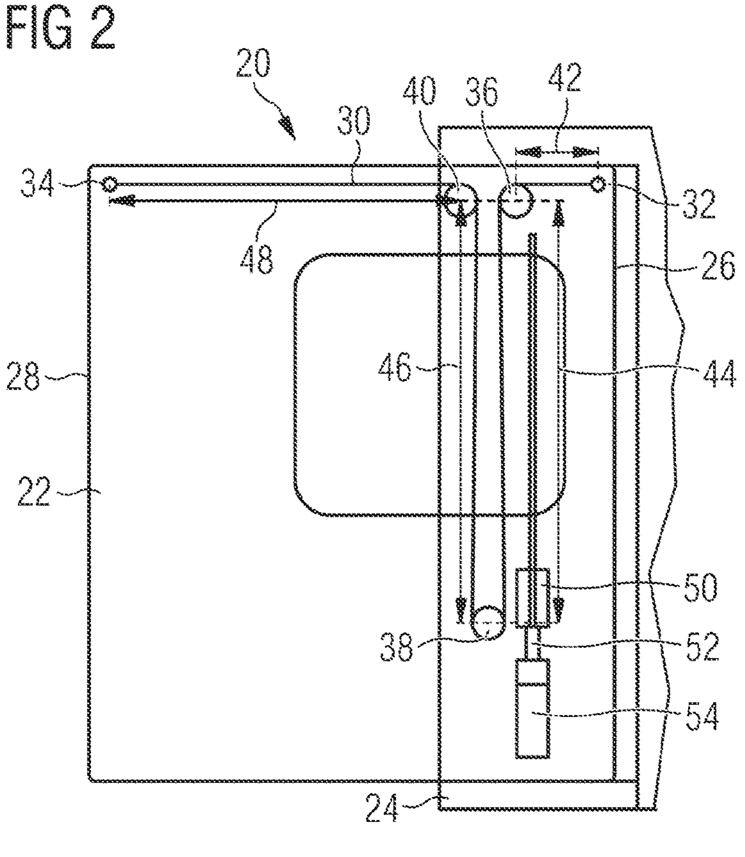
FIG. 2: shows the vehicle sliding door system according to the disclosure from FIG. 1 with an opened vehicle sliding door system.
Figure 3:
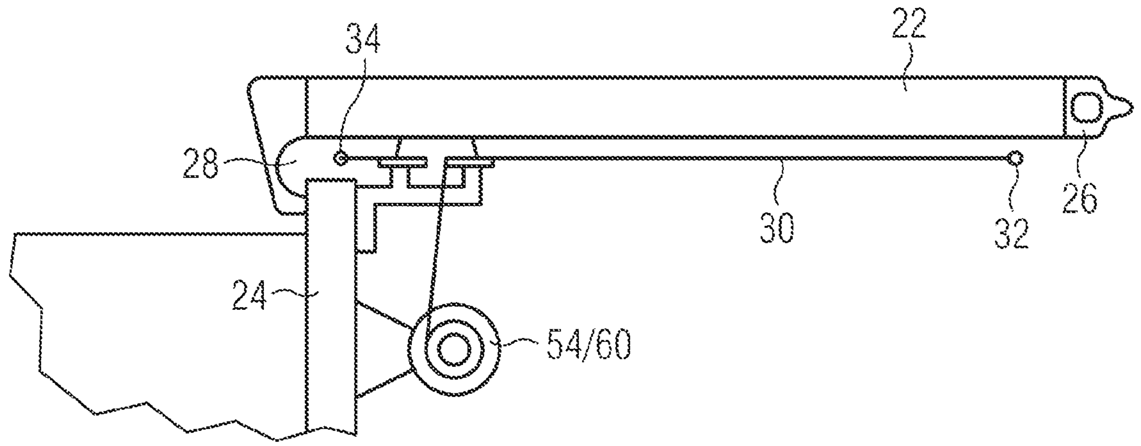
FIG. 3: shows the vehicle sliding door system according to the disclosure from FIG. 2 in a plan view from above.

FIGS. 1 to 3 illustrate a first advantageous embodiment of the disclosure. What is shown is a vehicle sliding door system 20 viewed from the vehicle interior. Two sliding doors 22 are arranged in a door portal 24 and can be displaced from the latter from a closed final position into an opened final position. As an example, what is shown is a vehicle sliding door system 20 with two sliding doors 22; however, the disclosure can also be used with only a single sliding door.

The sliding door 22 has an, in the closing direction, front vertical lateral edge 26 and an, in the closing direction, rear vertical lateral edge 28.

The door driving unit according to the disclosure has a cable 30 which, by means of a first attaching means 32 in the region of the front vertical lateral edge 26, and by means of a second attaching means 34 in the region of the rear vertical lateral edge 28, is attached to the sliding door. In the depicted exemplary embodiment, the cable 30 is connected to the sliding door 22, in each case with free ends on the two attaching means 32, 34.

Moreover, a first roller 36, a second roller 38 and a third roller 40, via which the cable 30 is redirected, are rotatably mounted on the door portal. This results in the following four portions of the cable 30:

- a first portion 42 extends in the horizontal direction from the first attaching means 32 to the first roller 36,
- a second portion 44 extends from the first roller 36 in the vertical direction to the second roller 38,
- a third portion 46 extends from the second roller 38 in the vertical direction to the third roller 40,
- a fourth portion 48 extends from the third roller 40 in the horizontal direction to the second attaching means 34.

In the vertical direction, the first roller 36 and the third roller 40 are arranged at approximately the same height, preferably at the same height as the two attaching means 32, 34 on the sliding door 22. In the depicted exemplary embodiment, the second roller 38 is located underneath the two other rollers 36, 40 in the vertical direction (between the two rollers 36, 40 preferably centrally in the horizontal direction).

The cable 30 is firmly connected with a coupling member 50; a movement of the coupling member 50 results in a movement of the cable 30. In the depicted exemplary embodiment, the coupling member 50 is connected in the second portion 44 with the cable 30; alternatively, however, it may also be connected therewith in the region of the third portion 44. The door driving unit causes a movement of the coupling member 50 in the vertical direction, i.e. parallel to the second portion 44 or third portion 46. In the depicted exemplary embodiment, this is accomplished by means of a spindle 52 driven by a motor 54. In the depicted exemplary embodiment, the coupling member 50 is configured as a displaceable spindle nut.

FIG. 1 depicts the vehicle sliding door system 20 with closed sliding doors 22. The coupling member 50 is located in its upper position. FIG. 2 depicts the vehicle sliding door system 20 with opened sliding doors 22; accordingly, the coupling member 50 is located in its lower position. FIG. 3 shows this embodiment with a closed sliding door 22 in a top view from above.

Figure 4:
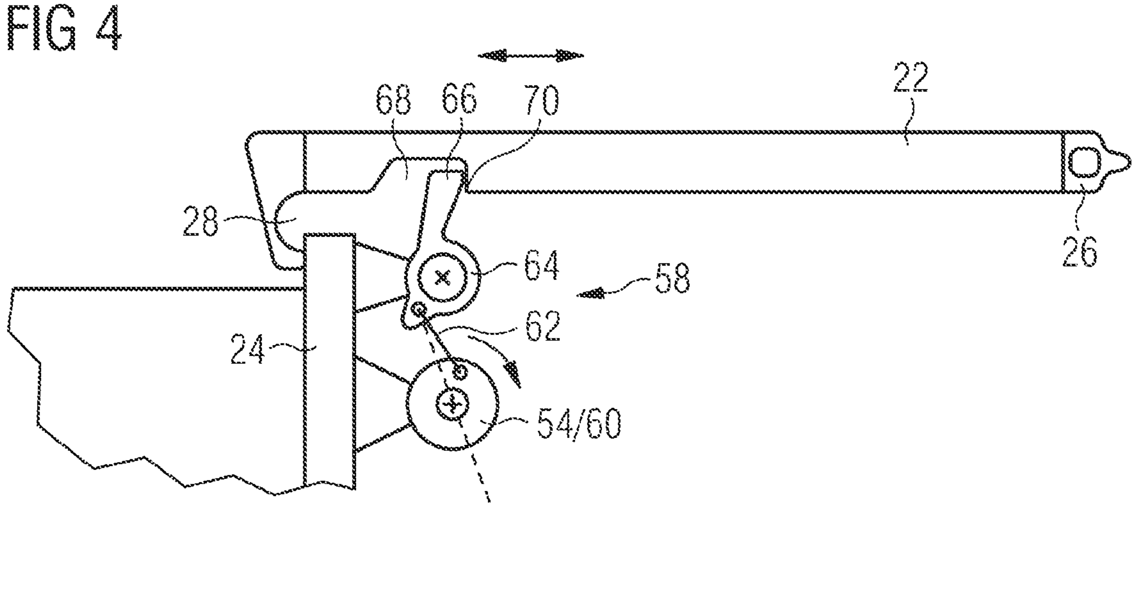
FIG. 4: shows the vehicle sliding door system according to the disclosure with a locking unit in a plan view.

FIG. 4 illustrates an advantageous locking device 58, which cooperates with the door driving unit according to the disclosure. The motor 54 attached to the door portal has a motor housing 60 on which a joint lever 62 is pivotably mounted on the side of the end thereof. With its other free end, the joint lever 60 is connected to a locking lever 64, which is also rotatably mounted on the door portal 24. The locking lever 64 has a free end 66, which in the depicted exemplary embodiment can be pivoted into a recess 68 of the sliding door 22 in order to lock the latter in the closed end position. An inner wall of the recess 68 thus serves as a counter bearing 70 for the locking lever 64.

The locking device 58 is activated when the sliding door 22 is located in the closed final position and the coupling member 50 cannot be displaced any further on the spindle 52. Thus, a rotation of the motor housing 60 is caused, which pivots the joint lever 60 or the locking lever 62 into its locking position. The motor housing 60 rotates, as it were, about the motor 54 located in the interior.

Figure 5:
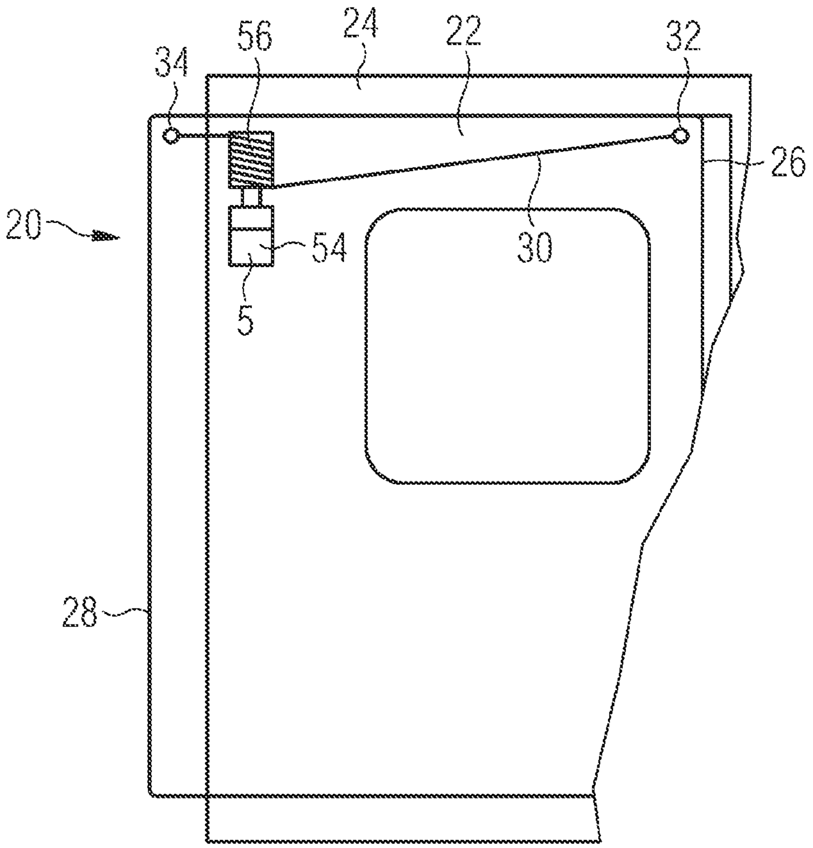
FIG. 5: shows a second embodiment of a vehicle sliding door system according to the disclosure.

The illustration in FIG. 5 shows that the locking device 58 is in an over-dead-center position when the sliding door 22 is closed. A displacement of the sliding door 22 into the opened final position is not possible; for this purpose, the over-dead-center position first has to be suspended by the rotation of the motor housing 58.

FIG. 5 shows an alternative embodiment of the disclosure. A cable pulley 56 is provided instead of the rollers 36, 38, 40 and the spindle drive. The cable pulley 56 is driven by the motor 54 and spools up or unspools the cable 30. The cable pulley 56 is arranged at approximately the same height in the vertical direction as the two attaching means 32, 34. By rotating the cable pulley 56, the sliding doors 22 are opened or closed, depending on the direction of rotation of the cable pulley 56.

Alternatively, it is also possible to configure one or several of the rollers 36, 38, 40 as a motor-driven cable pulley 56 in the embodiment according to the FIGS. 1 to 4. The sliding door 22 can also be moved by spooling up or unspooling the cable 30. In particular, the lowermost roller 38 is particularly suitable for being configured as a cable pulley 56, for reasons of space.

It is also conceivable that one of the rollers 36, 38, 40 is configured as a driven pinion gear meshing with a toothed region of the cable 30. Accordingly, the cable 30 has a configuration similar to a toothed belt across a longitudinal section of suitable length. In this case, the toothed belt portion may be formed from the cable 30 itself, but may also be formed by an additional element connected to the cable 30. In principle, the entire cable 30 may even be replaced with a toothed belt, which is driven or moved via one or several rollers 36, 38, 40.

The disclosure is not limited to the exemplary embodiment shown, but also includes other useful deviations from the illustrated design. For example, it would be possible to provide a toothed-belt drive instead of the spindle 52.

The invention claimed is:

1. A vehicle sliding door system with a door portal and a door opening, at least one sliding door with a front lateral edge and a rear lateral edge, and a door driving unit for displacing the sliding door, wherein the door driving unit comprises:

- a cable having a first end attached to the sliding door in the region of the front vertical lateral edge, and having a second end in the region of the rear vertical lateral edge, and
- a coupling member, which is connected to the cable and which is connected to a motor, which is attached on the door portal laterally next to the door portal and which drives the coupling member such that the cable is movable along its a longitudinal extent in both directions of movement and displaces the sliding door, wherein a first roller, a second roller, and a third roller, via which the cable is redirected, are rotatably mounted on the door portal, with the following cable portions resulting therefrom:

- a first portion extending in the horizontal direction from a first attaching means to the first roller,
- a second portion extending from the first roller in the vertical direction to the second roller,
- a third portion extending from the second roller in the vertical direction to the third roller, and
- a fourth portion extending from the third roller in the horizontal direction to a second attaching means.

2. The vehicle sliding door system according to claim 1, wherein the coupling member is connected to the cable in one of two vertically extending portions.

3. The vehicle sliding door system according to claim 2, wherein the coupling member is configured as a spindle nut arranged on a spindle driven by the motor.

4. The vehicle sliding door system according to claim 1, wherein a cable pulley, on which the cable is configured to be spooled up and from which the cable is configured to be unspooled, is attached to the door portal in the path of the cable, wherein the cable pulley is driven by the motor.

5. A vehicle sliding door system with a door portal and a door opening, at least one sliding door with a front lateral edge and a rear lateral edge, and a door driving unit for displacing the sliding door, wherein the door driving unit comprises:

- a cable having a first end attached to the sliding door in the region of the front vertical lateral edge, and having a second end in the region of the rear vertical lateral edge, and
- a coupling member, which is connected to the cable and which is connected to a motor, which is attached on the door portal laterally next to the door portal and which drives the coupling member such that the cable is movable along a longitudinal extent in both directions of movement and displaces the sliding door, wherein a first roller, a second roller, and a third roller, via which the cable is redirected, are rotatably mounted on the door portal, with the following cable portions resulting therefrom:

- a first portion extending in the horizontal direction from a first attaching means to the first roller,
- a second portion extending from the first roller in the vertical direction to the second roller,
- a third portion extending from the second roller in the vertical direction to the third roller, and a fourth portion extending from the third roller in the horizontal direction to a second attaching means, wherein a cable pulley, on which the cable is configured to be spooled up and from which the cable is configured to be unspooled, is attached to the door portal in the path of the cable, wherein the cable pulley is driven by the motor, wherein the cable pulley is arranged at approximately a same height as the two attaching means in the vertical direction.

6. The vehicle sliding door system according to claim 1, further comprising a locking device via which the sliding door is configured to be locked in a closed final position.

7. A vehicle sliding door system with a door portal and a door opening, at least one sliding door with a front lateral edge and a rear lateral edge, and a door driving unit for displacing the sliding door, wherein the door driving unit comprises:

a cable having a first end attached to the sliding door in the region of the front vertical lateral edge, and having a second end in the region of the rear vertical lateral edge, a coupling member, which is connected to the cable and which is connected to a motor, which is attached on the door portal laterally next to the door portal and which drives the coupling member such that the cable is movable along a longitudinal extent in both directions of movement and displaces the sliding door, and a locking device via which the sliding door is configured to be locked in a closed final position, wherein on a motor housing rotatable relative to the motor, a joint lever is pivotably mounted on the side of the end thereof, which, with the other free end, is connected to a locking lever rotatably mounted on the door portal, wherein the locking lever is pivotable with the other free end on a counter bearing on the sliding door, such that the sliding door is locked in the closed final position.

8. The vehicle sliding door system according to claim 7, wherein the locking device is in an over-dead-center position when the sliding door is closed.

* * * * *